O. NEUKIRCH.
TIRE PROTECTOR.
APPLICATION FILED JAN. 6, 1910.
973,545.
Patented Oct. 25, 1910.
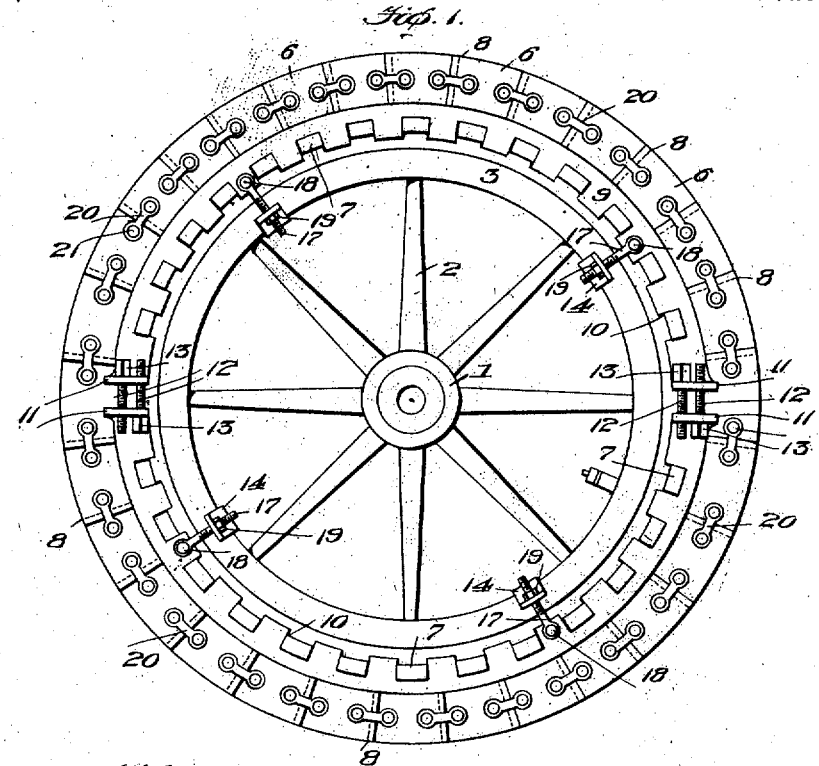
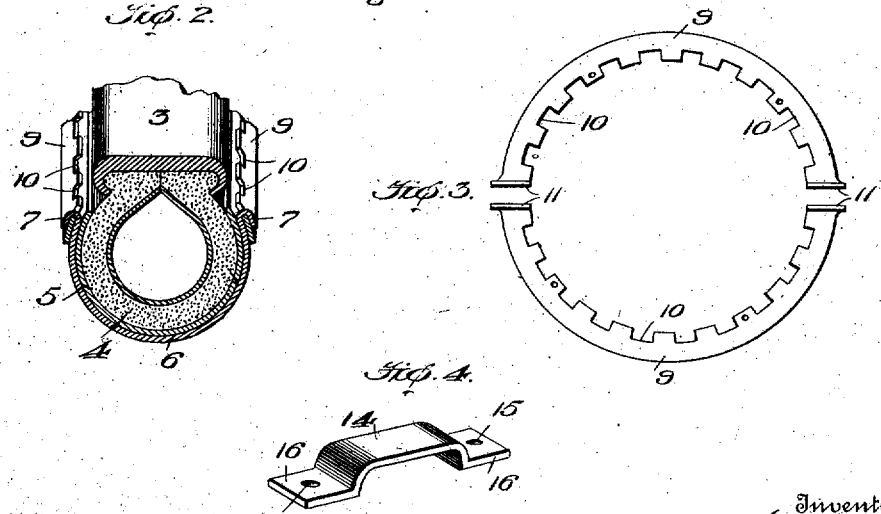
Witnesses
Elsie Chesley Blakistone
Inventor
Otto Neukirch
By
Attorney

UNITED STATES PATENT OFFICE.

OTTO NEUKIRCH, OF CINCINNATI, OHIO.

TIRE-PROTECTOR.

973,545.    Specification of Letters Patent.    Patented Oct. 25, 1910.

Application filed January 6, 1910. Serial No. 536,678.

*To all whom it may concern:*

Be it known that I, OTTO NEUKIRCH, a citizen of the United States, residing at Cincinnati, in the county of Hamilton and State of Ohio, have invented certain new and useful Improvements in Tire-Protectors, of which the following is a specification.

This invention relates to tire protectors designed more particularly for use on automobile wheel tires, and one of the principal objects of the same is to provide simple, reliable and efficient means for covering the tread surface of a pneumatic or other tire for preventing punctures, and to provide means for preventing the tire from skidding.

Another object of the invention is to provide a tire armor comprising a series of overlapping plates applied to the tread surface of the tire to prevent skidding, said plates being connected by links, which permit a slight movement of the plates, one relatively to the other, means being provided for holding the armor plates firmly in position upon a tire.

Still another object of the invention is to provide an armor tire comprising a series of overlapping plates having oppositely disposed hooks adapted to engage recesses in sectional rings adjustably secured to the rim of the wheel, said sectional rings being formed of semi-circular sections adjustably connected together for holding the armor plates in place.

These and other objects may be attained by means of the construction illustrated in the accompanying drawing, in which—

Figure 1 is a side view of an automobile wheel provided with a tire protector made in accordance with my invention. Fig. 2 is a sectional view taken through the tire and rim. Fig. 3 is a side elevation of the two sections of one of the rings disconnected. Fig. 4 is a detail perspective view of a clamp plate designed to engage the rim of the wheel and to be held in position by eye bolts.

Referring to the drawing the numeral 1 designates the hub of a wheel, 2 are the spokes, 3 the rim and 4 the tire. The wheel and tire may be of any desired construction, and my invention is applicable to any form of pneumatic or cushion tire, but is preferably used on the pneumatic type of tire.

Applied to the tread surface of the tire is the shield or cover 5 of leather or other suitable flexible material, this shield serving to prevent the cutting of the tire by the slight movement of the armor plates. These armor plates 6 are curved to fit snugly against the outer surface of the shield 5 and are provided at opposite sides, each with a centrally disposed upwardly extending hook 7. The armor plates 6 are designed to overlap, one upon the other, as shown by the dotted lines 8 in Fig. 1. The armor plates 6 may be formed of any suitable metal or other material and may be provided with a roughened tread surface. Sectional rings are provided upon opposite sides of the tire, said rings each comprising two sections 9 of semi-circular form in plan, said sections each being provided with a series of recesses or notches 10 in the inner edge thereof. At the ends of the sections 9 outwardly extending flanges 11 are provided, and extending in opposite directions through openings in these flanges are the clamping screws or bolts 12, said bolts having polygonal heads 13 for the accommodation of a wrench for turning said screws or bolts in the threaded openings in the flanges 11, thus clamping the armor plates 6 firmly upon the tread surface of the tire.

For holding the sectional rings firmly in place upon the rim of the tire, any suitable number of clamps may be provided, said clamps comprising each a plate 14 designed to fit the inner surface of the rim 3, said plates each having a bolt hole 15 in the oppositely disposed feet or flanges 16. Eye bolts 17, connected to the ring sections 9 by means of suitable rivets 18, extend through the bolt holes 15, and are provided with nuts 19 fitted to the threaded portion of said eye bolts for firmly holding the ring sections to the rim. It will be noted in Fig. 1 that four clamps of the character referred to are employed. Any suitable number, however, may be utilized. The armor plates 6 are connected together by means of suitable links 20, said links being connected by means of rivets 21 to the armor plates 6. The links 20 are provided with holes at their opposite ends for the rivets or screws 21, said holes being of slightly larger diameter than the rivets 21 in order that a slight movement of the plates 6 may be permitted, one relatively to the other.

From the foregoing it will be obvious that a tire protector made in accordance with my invention, can be quickly applied to a tire, will prevent skidding of the tire and will provide means for preventing punctures. The cost of manufacture of the tire protector is comparatively slight, and it can be readily applied to any of the well known types of pneumatic or cushion tires.

Having thus fully described the invention what is claimed as new is:

1. A tire protector comprising a series of overlapping armor plates, links for connecting together said plates, spaced hooks formed on the opposite edges of said armor plates, sectional rings provided with notches to be engaged by the hooks on the armor plates, means for adjusting said sectional rings, and means for connecting said sectional rings to the rim of the wheel.

2. A tire protector comprising a flexible shield applied to the tread surface of the tire, a series of overlapping armor plates disposed over the flexible shield, said armor plates being provided with spaced hooks upon their opposite edges, sectional rings provided with outwardly turned spaced flanges, means for adjusting said sectional rings, and means for connecting said sectional rings to the rim of a wheel, said sectional rings being provided with notches to be engaged by the hooks on the armor plates.

In testimony whereof I affix my signature in presence of two witnesses.

OTTO NEUKIRCH.

Witnesses:
ADOLPH A. GOUBER,
EMMA NEUKIRCH.